US012587081B2

(12) United States Patent
Orr

(10) Patent No.: US 12,587,081 B2
(45) Date of Patent: Mar. 24, 2026

(54) AVERAGE CURRENT MODE CONTROL OF DIGITAL VOLTAGE SOURCES

(71) Applicant: VERMILLION POWER TECHNOLOGIES INC., Calgary (CA)

(72) Inventor: Raymond Kenneth Orr, Calgary (CA)

(73) Assignee: VERMILLION POWER TECHNOLOGIES INC., Calgary (CA)

( * ) Notice: Subject to any disclaimer, the term of this patent is extended or adjusted under 35 U.S.C. 154(b) by 482 days.

(21) Appl. No.: 18/131,545

(22) Filed: Apr. 6, 2023

(65) Prior Publication Data

US 2024/0339913 A1    Oct. 10, 2024

(51) Int. Cl.
*H02M 1/00* (2007.01)
*H02M 3/00* (2006.01)

(52) U.S. Cl.
CPC ....... *H02M 1/0009* (2021.05); *H02M 1/0012* (2021.05); *H02M 3/00* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575;

G05F 1/30; G05F 1/33; G05F 1/32; G05F 1/34; G05F 1/38; G05F 1/465; G05F 1/468; G05F 1/562; G05F 1/565; G05F 1/567; G05F 1/569; G05F 1/571; G05F 1/573; G05F 1/5735; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17;

(Continued)

(56) References Cited

U.S. PATENT DOCUMENTS 5,801,935 A * 9/1998 Sugden ............... H02M 1/4225
323/284
6,426,663 B1 * 7/2002 Manlove ................. G01P 15/08
327/307

(Continued)

*Primary Examiner* — Crystal L Hammond
*Assistant Examiner* — Nusrat Quddus

(57) ABSTRACT

The present disclosure relates to average current mode control of digital voltage sources. A digital control signal is generated to control the voltage source. The digital control signal is based on output current of a voltage source and upper and lower signals. The upper and lower signals are based on respective positive and negative offsets and a difference between a reference signal and a feedback signal related to the output voltage.

26 Claims, 5 Drawing Sheets

100

(58) Field of Classification Search

CPC .......... H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; H02M 1/12; H02M 3/3155; H02M 3/33507; H02M 3/33546; H02M 7/1557; H02M 7/1626; H02M 7/219; H02M 7/151; H02M 5/4585; H02M 1/08; H02M 7/1552; H02M 7/1623; H02M 3/33592; H02M 3/073; H02M 3/137; H02M 7/00; H02M 7/064; H05B 39/048; B23K 11/24; H04B 2215/069; H02J 3/46; H02J 3/38; H02J 7/12

See application file for complete search history.

(56) References Cited

U.S. PATENT DOCUMENTS

| | | | | |
|---|---|---|---|---|
| 7,772,904 B1* | 8/2010 | Cooke | ..................... | H03K 7/08 |
| | | | | 327/175 |
| 2001/0033504 A1* | 10/2001 | Galbiati | ........... | H02M 7/53873 |
| | | | | 363/98 |
| 2006/0043955 A1* | 3/2006 | Hung | ................... | H02M 3/158 |
| | | | | 323/283 |
| 2008/0043810 A1* | 2/2008 | Vogt | ......................... | G01K 1/02 |
| | | | | 374/170 |
| 2010/0079323 A1* | 4/2010 | Miao | .................... | H02M 3/157 |
| | | | | 341/142 |
| 2012/0056605 A1* | 3/2012 | Ooba | .................... | H02M 3/157 |
| | | | | 716/122 |
| 2014/0176102 A1* | 6/2014 | Tang | ...................... | H03M 1/38 |
| | | | | 323/283 |
| 2016/0218625 A1* | 7/2016 | Chen | ................ | H02M 3/33523 |
| 2020/0186047 A1* | 6/2020 | Sen | ................... | H02M 3/33523 |
| 2020/0287459 A1* | 9/2020 | Schmitz | ............... | H02M 3/157 |
| 2022/0190719 A1* | 6/2022 | Zanchi | .................. | H02M 3/158 |

* cited by examiner

100

200

300

400

500

600

700

800

900

AVERAGE CURRENT MODE CONTROL OF DIGITAL VOLTAGE SOURCES

FIELD

The present application relates generally to power electronics and control of power circuits, and in particular to current mode control of digital voltage sources based on average current.

BACKGROUND

Many digitally controlled power supply circuits are voltage sources, in which output voltage is directly proportional to the value of a digital word. The digital word that controls the output voltage may be generated in any of various ways, and may involve current mode control.

Some conventional methods of current mode control for digitally controlled power supplies involve nesting a voltage source in a current loop that is formed by sensing a current, comparing that sensed current to a reference, and compensating the output of the comparison to form an error signal that is then used in generating a digital word to control the voltage source. Although such nesting can provide benefits of current mode control, improved approaches to current mode control are desirable.

SUMMARY

The present disclosure encompasses current mode control of a digitally controlled voltage source, such that the voltage source behaves as a current source. Potential advantages of current mode control include simpler loop compensation and relative ease of connecting multiple power sources in parallel. Embodiments described herein may provide a type of hysteretic average current mode control, without creating a second servo loop for current control with its own associated error signal compensation.

According to one aspect of the present disclosure, an apparatus includes a current sense element and a digital control signal generator coupled to the current sense element. The current sense element is provided to determine an output current of a voltage source. The digital control signal generator is provided to generate a digital control signal to control the voltage source, based on the output current and upper and lower signals. The upper and lower signals are based on respective positive and negative offsets and a difference between a reference signal and a feedback signal related to the output voltage.

According to another aspect of the present disclosure, a method involves determining an output current of a voltage source, and generating a digital control signal, to control the voltage source, based on the output current and upper and lower signals. As noted above, the upper and lower signals are based on respective positive and negative offsets and a difference between a reference signal and a feedback signal related to the output voltage.

Other aspects and features of embodiments of the present disclosure will become apparent to those ordinarily skilled in the art upon review of the following description.

BRIEF DESCRIPTION OF THE DRAWINGS

Embodiments will be described, by way of example only, with reference to the accompanying drawings.

DETAILED DESCRIPTION

Figure 1:
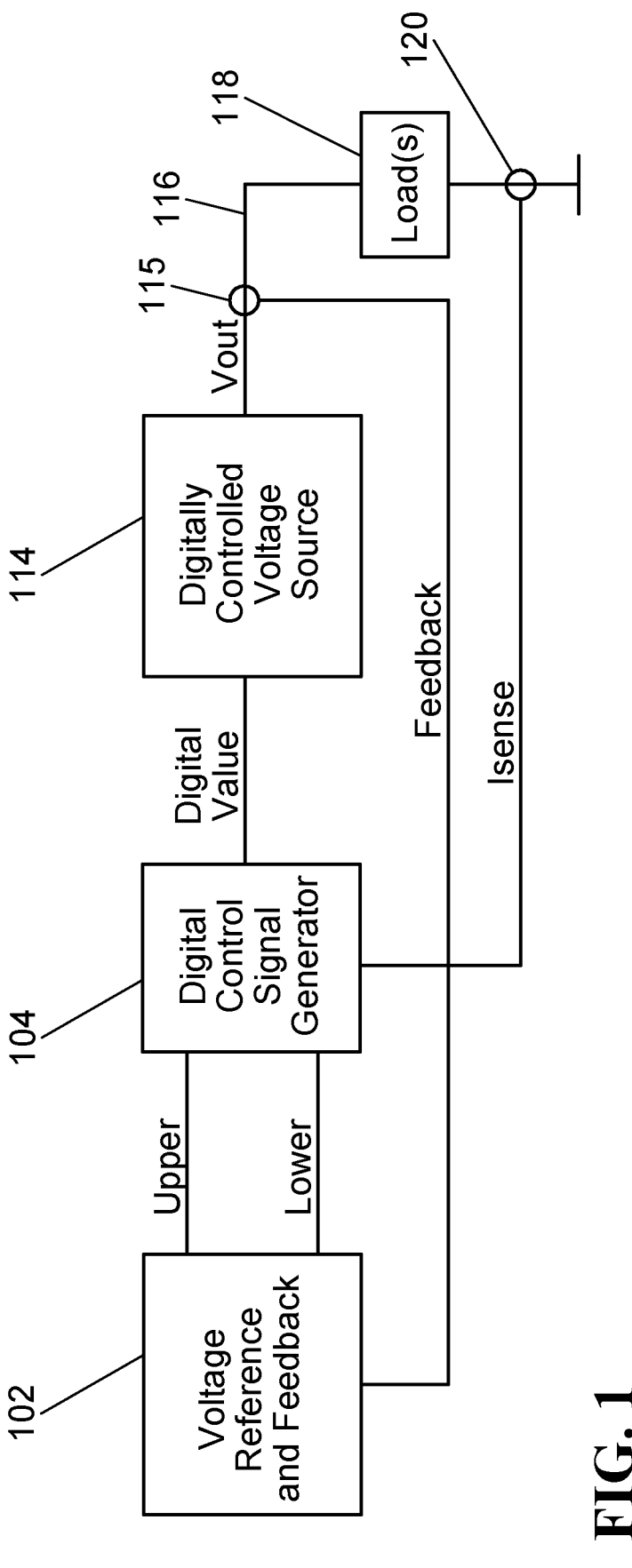
FIG. 1 is a block diagram illustrating a power circuit with average current mode control according to one embodiment.

Digitally controlled voltage sources may be referenced, herein and elsewhere, as digital power sources or power supplies. Such a power source or power supply may be or include a voltage source that generates an output voltage from a digital word. For example, a digital counter may be used to count to a value and a pulse width may be determined based on the count value. The pulse width is within a longer interval associated with a period of a pulse width modulation (PWM) signal, and the output voltage is dependent upon the pulse width and the PWM signal period. This is an example of how an output voltage may be derived from a digital word.

When such a PWM method is used, the PWM signal may drive power switches to switch power from a direct current (DC) source to produce an output voltage with an average value that is set by the digital word controlling the PWM. The power that is switched from the DC source is then filtered to produce the desired DC output power. This is one way, but certainly not the only way, to generate an output voltage that is controlled by a digital word or other form of digital control signal. Although embodiments disclosed herein may be applied in conjunction with such digitally controlled voltage sources, disclosed embodiments are not in any way limited to this or any other type of digitally controlled voltage source.

According to some embodiments disclosed herein, a voltage source provides an output voltage that is controlled in a hysteretic control loop that increments or decrements a digital value. An output current of a voltage source is sensed, and a current sense signal is fed to two comparators. The other inputs of the two comparators are each provided with a respective different signal that, in effect, sets the current at which each comparator switches its output state. The outputs of the two comparators increment or decrement the digital value.

The two different signals that are provided as inputs to the comparators may be referred to as an upper offset reference signal and a lower offset reference signal or, for ease of reference, an upper signal and a lower signal. These signals may be provided by or derived from a digital to analog converter (DAC) output signal in some embodiments. In DAC embodiments, a digital input to a DAC or an analog output generated by a DAC may be shifted upward (for the upper signal) and downward (for the lower signal) by a small increment or offset. In the case of shifting a digital signal upward and downward, two DACs may be used to convert the two shifted versions of the digital signal to provide the upper signal and the lower signal. A single DAC may be used to convert a digital signal to an analog signal for upward and downward shifting to provide the upper signal and the lower signal.

A digital error signal may be generated for digital to analog conversion, possibly after upward and downward shifting in embodiments in which shifting is applied before conversion, by subtracting a feedback signal that is related to the output voltage of the voltage source from a reference signal, to produce an uncompensated error signal. This uncompensated error signal may then be compensated to generate a compensated error signal, by providing the uncompensated error signal to a proportional integral differential (PID) control block or controller, for example. The compensated error signal may then be fed to the DAC when one DAC is used. In embodiments that include two DACs and involve digital shifting before digital to analog conversion, the compensated error signal is shifted upward and downward by, for example, respectively adding and subtracting a small value, also referred to herein as an offset or increment. The upward shifted compensated digital error signal is provided as an input to the DAC that generates the upper signal for one comparator, and the downward shifted compensated digital error signal is provided as an input to the DAC that generates the lower signal for the other comparator.

This type of arrangement, with upper and lower signals based on a voltage difference and respective comparators that receive the upper signal and the lower signals as inputs, provides a servo loop that controls the output voltage such that it is regulated to be substantially equal to a target or reference voltage. The average current for current mode control is controlled by the compensated error signal, at the output of the PID controller in the example above, and the two comparators with the different upper and lower signals, provide hysteretic limits for the output current of the voltage source. The output current will oscillate between the upper and lower signals to control the average current to a value that is set by the compensated error signal.

Embodiments are not limited to DAC embodiments. An analog signal may be generated by a DAC or otherwise, based on a difference between an output voltage and a reference signal, and shifted upward to provide the upper signal and downward to provide the lower signal.

These and other features are described in detail herein, at least below.

FIG. 1 is a block diagram illustrating a power circuit 100 with average current mode control according to one embodiment. The example power circuit 100 includes a voltage reference and feedback block 102, a digital control signal generator 104, a digitally controlled voltage source 114, a terminal 116, load(s) 118, a voltage sense element 115, and a current sense element 120, which are interconnected as shown.

Embodiments disclosed herein are not restricted to any particular type of voltage reference and feedback block 102, and illustrative examples of such a voltage reference and feedback block are provided below with reference to FIGS. 2, 3, and 4.

Similarly, embodiments also are not restricted to any particular type of digital control signal generator 104. Examples of a digital value generator are described at least below with reference to FIGS. 5, 6, and 7.

As noted above, embodiments disclosed herein may be applied in conjunction with PWM-based digitally controlled voltage sources. An illustrative example of such a voltage source is provided below with reference to FIG. 8, but embodiments are not in any way limited to this or any other type of digitally controlled voltage source 114.

The load(s) 118 may include one or more electrical loads that are connected to terminal 116 and supplied with power by the digitally controlled voltage source 114. The power circuit 100 is not specific to any type of electrical load(s) 118, which is shown only in the interest of completeness. In general, a controller and a power supply such as the digitally controlled voltage source 114 may be provided together with or separately from the electrical load(s) 118.

The voltage sense element 115 may be implemented in any of various ways, as will be apparent to those familiar with power electronics and power control, and the present disclosure is not limited to any particular type of voltage sense element. Examples include voltmeters and other types of voltage sensors or voltage measurement devices.

The current sense element 120 may be or include a current sensor or device such as an ammeter or other current sensor. Other types of current sensors or devices will be apparent to those familiar with power electronics and control. Embodiments are not restricted to any particular type of current sense element. Current sensors may include one or more filters or otherwise provide filtering to remove high frequency noise or to smooth a current sense signal, shown in FIG. 1 as Isense. The current sense element 120 may produce an analog signal or digital Isense signal.

More generally, it should be appreciated that the power circuit 100 is an illustrative and non-limiting example. Other embodiments may include fewer, additional, and/or different elements, interconnected in a similar way or a different way than shown.

Turning now to operation, the current through the load(s) 118, which may also or instead be referred to as an output current of the digitally controlled voltage source 114, is determined by the current sense element 120. In the example shown, the current sense element 120 generates the current sense signal Isense, which is provided to the digital control signal generator 104. The voltage reference and feedback block 102 receives a feedback signal that is related to the output voltage Vout. The feedback signal is received by the voltage reference and feedback block 102 from the digitally controlled voltage source 114 in the example shown.

The voltage reference and feedback block 102 generates an upper signal and a lower signal. The digital control signal generator 104 receives the upper signal and the lower signal from the voltage reference and feedback block 102, and also receives the Isense signal from current sense element 120. The digital control signal generator 104 produces a digital control signal, such as a digital value, that is sent to the digitally controlled voltage source 114. The digitally controlled voltage source 114 produces the output voltage Vout at the terminal 116, based on the digital control signal that it receives from the digital control signal generator 104. The load(s) 118 are connected to the digitally controlled voltage source 114 at terminal 116 as shown, and it is the current flowing through the load(s) 118 that is sensed by the current sense element 120. Thus, the digitally controlled voltage source 114 uses the digital value from the digital control signal generator block 104, to generate the output voltage Vout at terminal 116, and the output voltage Vout is provided to the load(s) 118. The output voltage Vout may also be provided as the feedback signal to the voltage reference and feedback block 102.

The digital control signal that is generated by the digital control signal generator 104 to control the digitally controlled voltage source 114 is based on the output current and the upper and lower signals, and the upper and lower signals are based on respective positive and negative offsets and a difference between a reference signal and the feedback signal related to the output voltage Vout. Examples of how these features may be provided or supported in some embodiments are described at least below.

The Isense signal in FIG. 1 may be referred to as a sense signal or a measurement signal for example, and may be described as being indicative of or related to an output current of the digitally controlled voltage source 114, which is sensed by the current sense element 120. Current sensing is external to the digital control signal generator 104 and the digitally controlled voltage source 114 in FIG. 1, and it should therefore be appreciated that the digital control signal generator 104 in FIG. 1 itself may, but need not necessarily, sense the output current. For example, the output current may be obtained or otherwise determined by the digital control signal generator 104 or a component thereof, by receiving an Isense signal as shown. In the example power circuit 100, the current sense element 120 determines the output current of the digitally controlled voltage source 114, and the digital control signal generator block 104 is coupled to the current sense element to receive the Isense signal.

Although FIG. 1 does not explicitly show a voltage sense element, a voltage sense element or another element may be provided in some embodiments to provide the feedback signal, which is related to the output voltage Vout, to the voltage reference and feedback block 102. The feedback signal may be the output voltage Vout itself, a voltage sense signal or measurement signal from a voltage sensor, or another form of feedback signal related to the output voltage Vout. More generally, a connection between the digitally controlled voltage source 114 and the voltage reference and feedback block 102 as shown in FIG. 1 enables the upper and lower signals to be generated based on respective positive and negative offsets and a difference between a reference signal and the feedback signal.

Figure 2:
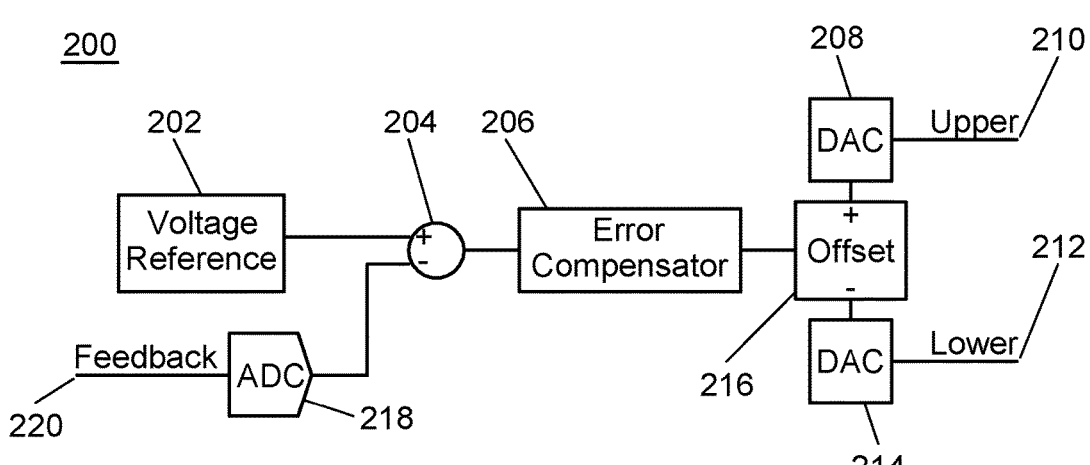
FIG. 2 is a block diagram illustrating an example voltage reference and feedback block.

FIG. 2 is a block diagram illustrating an example voltage reference and feedback block 200, which may be implemented as the voltage reference and feedback block 102 in FIG. 1, for example. The example voltage reference and feedback block 200 includes a voltage reference block 202, a difference block 204, an error compensator 206, two DACs 208, 214, an offset reference signal generator 216, and an analog to digital converter (ADC) 218, interconnected as shown. An input terminal 220 is provided to receive a feedback signal related to output voltage Vout, and output terminals 210, 212 are provided for the upper and lower signals, respectively.

In the example shown, the voltage reference block 202 is a digital voltage reference generator. Those familiar with power electronics and power control will be familiar with various possible implementations of digital voltage reference generators, and the present disclosure is not in any way restricted to any particular type of digital voltage reference generator. A voltage reference is also referred to herein as a reference signal.

The difference block 204 is another digital element in the example shown, and again the present disclosure is not in any way limited to any particular type of difference block. Examples include an adder with an inverter or an inverted input.

The error compensator 206 is also a digital element in FIG. 2. A proportional integral differential (PID) controller is an example of an error compensator. PID controllers in general are well-known, and embodiments disclosed herein are not in any way restricted to a particular type of PID controller.

Each DAC 208, 214 may take any of various forms, examples of which will be apparent to those familiar with power electronics and control. The embodiments herein are not restricted to any particular type of DAC.

The offset reference signal generator 216 may be or include, for example, multiple adders, one of which incorporating or being connected to an inverter, or an adder and a subtractor, and again the present disclosure is not in any way limited to any particular type of offset block.

The ADC 218 may take any of various forms, examples of which will be apparent to those familiar with power electronics and control. Although shown in FIG. 2 as an ADC, conversion of the feedback signal, such as Vout or a voltage sense signal, to digital form for the digital difference block 204 may equivalently be achieved or implemented in other ways. A digital voltage sense element may be provided to sense the output voltage Vout and provide a digital output, for example. Again, embodiments disclosed herein are not dependent upon any particular type of ADC or any particular type of conversion of an analog feedback signal to digital form.

In operation, the feedback signal at the input terminal 220 may be received from the voltage sensor 115 of FIG. 1, for example. The feedback signal provides voltage information about the output voltage Vout, at the load(s) 118 in FIG. 1 for example, to the ADC 218. The ADC 218 converts Vout to a digital feedback signal and provides the digital feedback signal to the negative input of difference block 204.

The positive input of the difference block 204 is provided a digital voltage reference signal from the voltage reference block 202. The difference block 204 generates an uncompensated digital error signal and provides that digital error signal as an input to the error compensator 206. This uncompensated digital error signal is, in the example shown, the mathematical difference resulting from subtracting the digital feedback signal, which is related to the output voltage Vout and is converted to digital form by the ADC 218, from the digital voltage reference signal provided by the voltage reference block 202. Put another way, the uncompensated digital error signal indicates or represents, and therefore in at least this sense is based on, a difference between the reference signal (from the voltage reference block 202) and the feedback signal.

The voltage reference signal is, in effect, a reference signal for the feedback signal, and in at least this sense may be considered as indicating or corresponding to a target output voltage. Thus, with the feedback signal being related to the voltage source output voltage Vout, the digital error signal may also or instead be described as being related to, indicative of, or based on a difference between the voltage source output voltage Vout and a target output voltage.

In FIG. 2, the difference block 204 is connected to the ADC 218 to receive at its negative input a digital feedback signal that is related to the output voltage Vout, and subtracts that signal at its negative input from the reference signal at its positive input to generate the uncompensated digital error signal.

The error compensator 206 is connected to receive, at its input, the uncompensated digital error signal generated by the difference block 204. The error compensator 206 shapes the uncompensated digital error signal in the sampled frequency domain to produce a compensated digital error signal, which is provided to the input of the offset reference signal generator 216 in the example shown.

The offset reference signal generator 216 produces a first output which is equal to the compensated digital error signal plus a small increment, which is also referred to herein as an offset. This first output is provided to the DAC 208.

The offset reference signal generator 216 also produces a second output which is equal to the compensated digital error signal minus a small increment. This second output is provided to the DAC 214.

Thus, the offset reference signal generator 216 generates the first output that is a digital signal with a positive offset from the compensated digital error signal, and the second output that is a digital signal with a negative offset from the compensated digital error signal. The digital signal with a positive offset is provided to an input of the DAC 208, and the digital signal with a negative offset is presented to an input of the DAC 214. The DAC 208 converts the digital signal at its input into the analog upper signal at the terminal 210, and the DAC 214 converts the digital signal at its input into the analog lower signal at the terminal 212.

The compensated digital error signal is generated by shaping the uncompensated digital error signal, and therefore in at least this sense the compensated digital error signal is, like the uncompensated digital error signal, based on the difference between the reference signal and the feedback signal, which as described elsewhere is related to the output voltage Vout.

In this example voltage reference and feedback block 200, the upper and lower signals are based on positive and negative offsets, which are also referred to herein as increments, and a compensated digital error signal that is, as also described at least above, based on the difference between a reference signal and a feedback signal related to the output voltage Vout of a voltage source. In particular, in the example shown in FIG. 2, the upper signal is a first analog signal at the terminal 210, converted from a compensated digital error signal that is produced by the error compensator 206 and is shifted upward by the positive offset at offset reference signal generator 216; and the lower signal is a second analog signal at the terminal 212, converted from the compensated digital error signal that is produced by the error compensator 206 and is shifted downward by the negative offset at the offset reference signal generator 216.

By way of example, the positive and negative offsets may be of a magnitude of 10% of the maximum compensated digital error signal that may occur, such as 10% of a maximum signal value that a PID block can generate in the case of PID-based compensation. As another example, the offsets for the upper and lower signals may be on the order of ⅛ to ¹⁄₁₆ of a maximum signal value that the error compensator 206 can generate. More generally, offsets may be a fraction, percentage, or other value relative to a maximum signal value of an error signal or a difference signal that is based on the difference between the reference signal and a feedback signal related to voltage source output voltage Vout. These offsets are preferably of the same magnitude. As discussed in further detail elsewhere herein, the offsets may be digital offsets applied to a digital signal as in FIG. 2, or analog offsets applied to an analog signal.

Although FIG. 2, and similarly FIGS. 3 and 4 described below, illustrate embodiments in which error compensators generate compensated error signals, the present disclosure is not in any way restricted to such embodiments. Upper and lower signals may be based on an uncompensated error signal and respective offsets, and the offsets may be a fraction, percentage, or other value relative to a maximum signal value of the error signal. An error signal may be a compensated error signal in some embodiments, but error compensation need not be implemented in all embodiments.

The example implementation shown in FIG. 2 relates to an embodiment that includes: an offset reference signal generator 216 connected to receive a digital error signal, from the error compensator 206 in the example shown, and to shift the digital error signal upward by the positive offset and downward by the negative offset; a first DAC 208 coupled to the offset reference signal generator to generate the upper signal by converting the upward shifted digital error signal to analog; and a second DAC 214 coupled to the offset reference signal generator to generate the lower signal by converting the downward shifted digital error signal to analog. These elements for generating the upper and lower signals may be part of a voltage reference and feedback block 102 in the example power circuit 100, but in other embodiments may be provided separately or as part of another block or component such as a digital control signal generator.

Generation of the upper and lower signals is described herein primarily as shifting a digital signal or an analog signal upward by a positive offset and downward by a negative offset. The shifting may also or instead be referred to as applying the offsets to signals, offsetting the signals, adding the positive offset to signals and subtracting the negative offset from signals, or level shifting the signals by the offsets, for example. The offsets may be referred to not only as positive and negative offsets, but also or instead as upward and downward offsets, plus and minus offsets, or additive and subtractive offsets, for example.

Although FIG. 2 illustrates only one offset reference signal generator 216, other embodiments may include a first offset reference signal generator to receive and shift a digital error signal upward by the positive offset and a second offset reference signal generator to receive and shift the digital error signal downward by the negative offset. In such an embodiment the first DAC 208 may be coupled to the first offset reference signal generator to generate the upper reference signal by converting the upward shifted digital error signal to analog, and the second DAC may be coupled to the second offset reference signal generator to generate the lower reference signal by converting the downward shifted digital error signal to analog.

Figure 3:
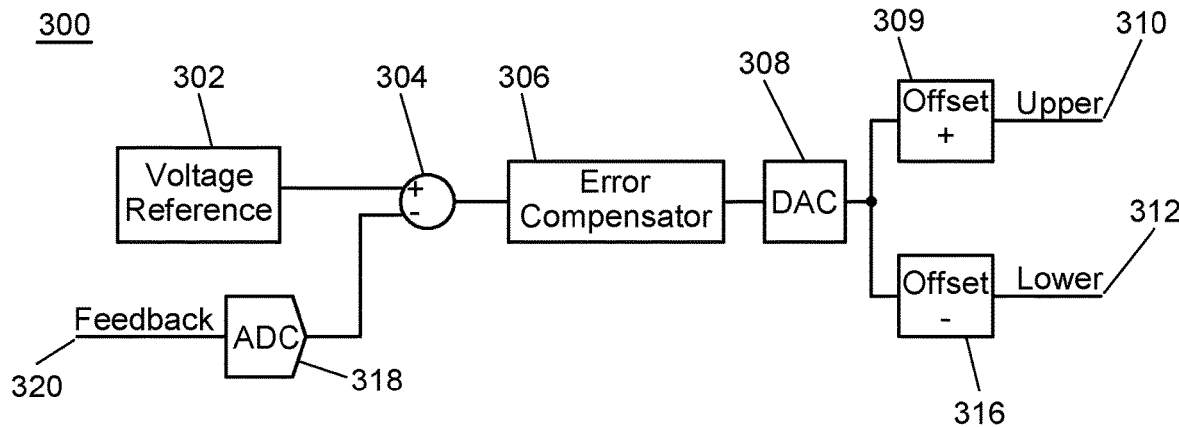
FIG. 3 is a block diagram illustrating another example voltage reference and feedback block.

FIG. 3 is a block diagram illustrating another example voltage reference and feedback block 300, which may be implemented as the voltage reference and feedback block 102 in FIG. 1, for example. The example voltage reference and feedback block 300 includes a voltage reference block 302, a difference block 304, an error compensator 306, a DAC 308, two offset reference signal generators 309, 316, and an ADC 318, interconnected as shown. An input terminal 320 is provided to receive a feedback signal related to output voltage Vout, and output terminals 310, 312 are provided for the upper and lower signals, respectively.

In the example voltage reference and feedback block 300, the voltage reference block 302, the difference block 304, and the error compensator 306 may be implemented and operate in the same way as similarly labelled elements in FIG. 2. The DAC 308 may similarly be implemented and operate in the same way as the DACs 208, 214, with the exception that the digital signal being converted to analog by the DAC 308 is the compensated digital error signal from the error compensator 306.

Disclosed embodiments are not in any way limited to any particular type or implementation of positive offset reference signal generator 309 and negative offset reference signal generator 316, which are analog offset blocks in FIG. 3. Various examples of analog offset blocks to offset analog signals upward or downward will be readily apparent to those familiar with power electronics and control.

Operation of the example voltage reference and feedback block 300 differs from that of the example voltage reference and feedback block 200 in FIG. 2 in that the DAC 308 converts the compensated digital error signal from the error compensator 306 to a compensated analog error signal, and offsets are applied to the compensated analog error signal. Again, as noted above with reference to FIG. 2, error compensation need not be implemented in all embodiments, and therefore features described with reference to a compensated error signal may also or instead be provided or supported more generally for an error signal, regardless of whether that error signal is a compensated error signal.

The compensated analog error signal is provided to inputs of the positive offset reference signal generator 309 and the negative offset reference signal generator 316.

The positive offset reference signal generator 309 receives the compensated analog error signal from the DAC 308 and produces an analog upper signal, at the terminal 310, which is equal to the compensated analog error signal plus the positive offset.

The negative offset reference signal generator 316 also receives the compensated analog error signal from the DAC 308 and produces an analog lower signal, at the terminal 312, which is equal to the compensated analog error signal minus the negative offset.

By way of example, the analog offsets that are applied in FIG. 3 may be of a magnitude of 10% of the analog value of a maximum error signal that may occur, such as a maximum of the compensated digital error signal in FIG. 3. As another example, the analog offsets for the upper and lower signals may be on the order of $1/8$ to $1/16$ of the analog value of a maximum error signal, such as the compensated digital error signal that the error compensator 206 can generate in the example shown in FIG. 3. More generally, analog offsets, similar to digital offsets as described by way of example with reference to FIG. 2, may be a fraction, percentage, or other value relative to a maximum analog signal value from conversion of an error signal or a difference signal that is based on the difference between the reference signal and a feedback signal related to voltage source output voltage Vout. Analog offsets, like digital offsets, are preferably of the same magnitude. The offsets are applied to a digital compensated error signal in FIG. 2, and to an analog compensated error signal in FIG. 3.

Although FIG. 3 illustrates two offset reference signal generators 309, 316, other embodiments may include a single offset reference signal generator to receive the analog signal that is converted from the digital signal from the error compensator 306 by the DAC 308, and to shift the analog signal both upward by the positive offset and downward by the negative offset to generate the upper and lower signals, respectively.

The example implementation shown in FIG. 3 is illustrative of an embodiment in which the upper and lower signals are based on the positive and negative offsets and an analog signal converted (by the DAC 308) from a digital error signal that is based on the difference between the reference signal and the feedback signal, and is compensated in the example shown. In this example, the upper signal is an upward shifted analog signal that has been shifted upward by the positive offset, and the lower signal is a downward shifted analog signal shifted downward by the negative offset. The analog signal that is shifted upward and downward is converted from a digital error signal, which is based on the difference between the reference signal and the feedback signal and is a compensated digital error signal in the example shown.

FIG. 3 is also illustrative of an embodiment that includes: a DAC 308 to convert a digital error signal that is based on the difference between the reference signal and the feedback signal (and is a compensated digital error signal from the error compensator 306 in the example shown) to an analog signal; a first offset signal generator 309 to receive the analog signal and to generate the upper signal by shifting the analog signal upward by the positive offset; and a second offset signal generator 316 to receive the analog signal and to generate the lower signal by shifting the analog signal downward by the negative offset.

Figure 4:
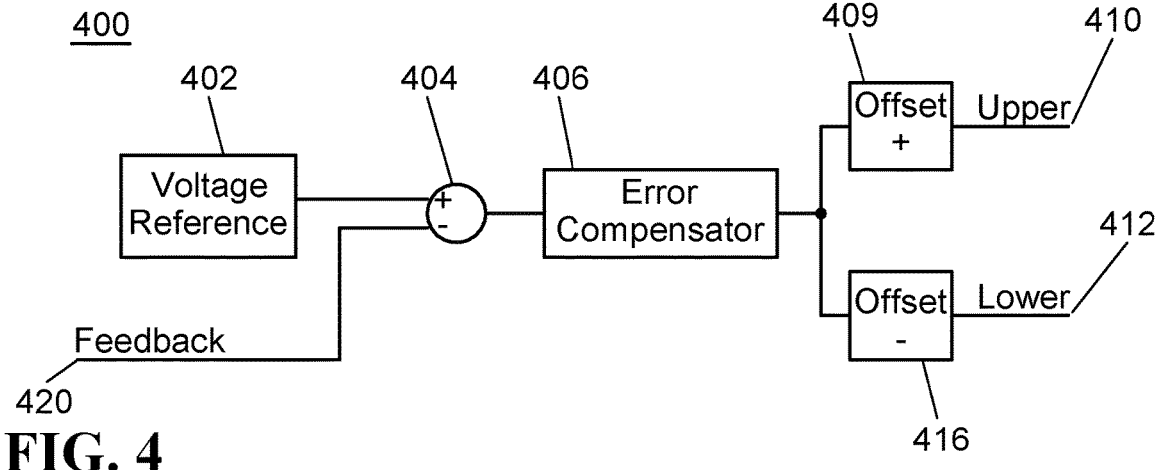
FIG. 4 is a block diagram illustrating another example voltage reference and feedback block.

FIG. 4 is a block diagram illustrating a further example voltage reference and feedback block 400, which may be implemented as the voltage reference and feedback block 102 in FIG. 1, for example. The example voltage reference and feedback block 400 includes a voltage reference block 402, a difference block 404, an error compensator 406, and two offset reference signal generators 409, 416, interconnected as shown. An input terminal 420 is provided to receive a feedback signal that is related to output voltage Vout, and output terminals 410, 412 are provided for the upper and lower signals, respectively.

In the example voltage reference and feedback block 400, the voltage reference block 402, the difference block 404, and the error compensator 406 are analog elements, and the feedback signal at the terminal 420 is an analog feedback signal. The offset reference signal generators 409, 416 may be implemented and operate in substantially the same way as similarly labelled elements in FIG. 3, but to apply positive and negative offsets to an analog error signal (which is a compensated error signal from the error compensator 406 in the example shown), without digital to analog conversion of a digital error signal as in FIG. 3. The example voltage reference and feedback block 400 is illustrative of an analog implementation of reference signal generation, error signal generation, compensation, and upper and lower signal generation.

The voltage reference block 402 is an analog voltage reference generator, and those familiar with power electronics and power control will be familiar with various possible implementations of analog voltage reference generators. The present disclosure is not in any way restricted to any particular type of analog voltage reference generator.

The difference block 404 is an analog element in the example shown. The present disclosure is not in any way limited to any particular type of difference block. Examples include an analog adder with an inverted input.

An analog PID controller is an example of error compensator 406. PID controllers in general are well-known, and embodiments disclosed herein are not in any way restricted to a particular type of PID controller or analog error compensator, or even to embodiments in which error compensation is implemented for an error signal.

In FIG. 4, the difference block 404 and the error compensator 406 are shown as separate elements. These two elements may be implemented together, with an operational amplifier and passive elements such as resistors, capacitors, and inductors for example. The embodiments disclosed herein are not in any way restricted to separate implementations of an error compensator and difference block.

Although the examples shown in FIGS. 2 and 3 are at least partially implemented digitally and the example in FIG. 4 is an analog implementation, overall operation of the example voltage reference and feedback block 400 in FIG. 4 is much the same as described above with reference to FIGS. 2 and 3.

The analog feedback signal at the input terminal 420 may be received from terminal 116 of FIG. 1, for example. The feedback signal, as disclosed elsewhere herein, is related to the output voltage Vout, and provides voltage information about the output voltage Vout at the load(s) 118 in FIG. 1 for example, to the negative input of the difference block 404.

The positive input of the difference block 404 is provided an analog voltage reference signal from the voltage reference block 402. The difference block 404 generates an uncompensated analog error signal and provides that analog error signal as an input to the error compensator 406. This uncompensated analog error signal is, in the example shown, the mathematical difference resulting from subtracting the analog feedback signal at the terminal 420 from the voltage reference signal provided by voltage reference block 402. The uncompensated analog error signal, like an uncompensated digital error signal in other embodiments, indicates or represents, and therefore in at least this sense is based on, a difference between the analog reference signal (from the voltage reference block 402) and the feedback signal at the terminal 420.

Like a digital voltage reference signal in other embodiments, the analog voltage reference signal is, in effect, a reference signal for the feedback signal, and may be considered as indicating or corresponding to a target output voltage. An analog feedback signal is related to the voltage source output voltage Vout, and thus the analog error signal may also or instead be described as being related to, indicative of, or based on a difference between the voltage source output voltage Vout and a target output voltage.

The error compensator 406 is connected to receive, at its input, the uncompensated analog error signal generated by the difference block 404. The error compensator 406 shapes the uncompensated error signal in the frequency domain to produce a compensated analog error signal, which is provided to the positive offset reference signal generator 409 and the negative offset reference signal generator 416.

Similar to the example shown in FIG. 3, the compensated error signal that is provided to the offset reference signal generators 409, 416 in FIG. 4 is an analog signal. The positive offset reference signal generator 409 receives the compensated error signal from error compensator 406 and produces an upper signal, at the terminal 410, which is equal to the compensated error signal plus the positive offset.

The negative offset reference signal generator 416 receives the compensated error signal from the error compensator 406 and produces a lower signal, at the terminal 412, which is equal to the compensated error signal minus the negative offset.

The analog offset examples provided at least above with reference to FIG. 3 also apply to the example voltage reference and feedback block 400.

The example implementation shown in FIG. 4 is illustrative of an embodiment in which the upper and lower signals are based on the positive and negative offsets and an analog error signal, which is a compensated error signal in the example shown. In FIG. 3, the analog error signal is converted (by the DAC 308) from a digital error signal, but in an analog implementation shown by way of example in FIG. 4 the error compensator 406 generates a compensated analog error signal without conversion from a digital error signal. The compensated analog error signal, or more generally an analog error signal that may or may not be a compensated error signal, is based on the difference between the analog reference signal from the voltage reference block 402 and the analog feedback signal at the terminal 420. In this example, the upper signal is an upward shifted analog signal that has been shifted upward by the positive offset, and the lower signal is a downward shifted analog signal shifted downward by the negative offset. The analog signal that is shifted upward and downward is based on the difference between the reference signal and the feedback signal. In FIG. 3, this analog signal is converted from a digital signal, but in FIG. 4 there is no such conversion.

FIG. 4 is also illustrative of an embodiment that includes: a first offset signal generator 409 to receive an analog error signal (which is a compensated analog error signal from the error compensator 406 in the example shown) that is based on the difference between the reference signal and the feedback signal, and to generate the upper signal by shifting the analog error signal upward by the positive offset; and a second offset signal generator 416 to receive the analog error signal, and to generate the lower signal by shifting the analog error signal downward by the negative offset.

In the examples illustrated in FIGS. 2, 3, and 4, equal positive and negative offsets produce an average value of the upper and lower signals that is equal to the compensated error signal. Hence, with reference again to FIG. 1, the upper and lower signals generated by the voltage reference and feedback block 102 are a result of the difference between a reference signal and the feedback signal related to the output voltage Vout.

The examples in FIGS. 2 and 3 illustrate that the voltage reference and feedback block 102 may be implemented as a digital module, component, or element where input signals and output signals are converted from and to analog and to and from digital, respectively. Features of the voltage and reference feedback block 102 may be implemented by purely analog means as shown by way of example in FIG. 4, or by some combination of analog and digital elements as shown by way of example in FIGS. 2 and 3. For example, the reference signal may be a digital reference signal (as shown by way of example in FIGS. 2 and 3) and the feedback signal may be a digital feedback signal or an analog feedback signal converted to a digital feedback signal (as shown by way of example in FIG. 3) in a digital or partially digital implementation. In implementations that are analog or partially analog, the reference signal may be an analog reference signal and the feedback signal may be an analog feedback signal as shown by way of example in FIG. 4.

The present disclosure is not in any way restricted to any particular type of voltage reference and feedback blocks, and the examples in FIGS. 2, 3, and 4 are illustrative and non-limiting.

Figure 6:
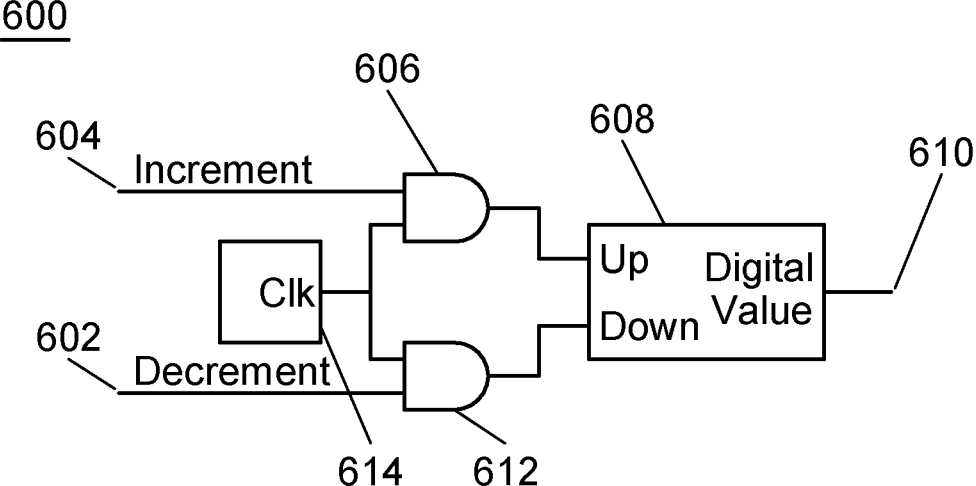
FIG. 6 is a block diagram illustrating an example digital value generator.
Figure 7:
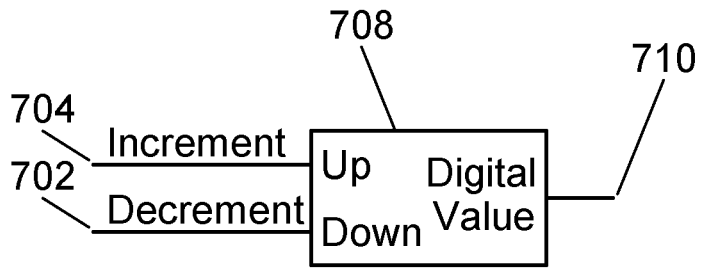
FIG. 7 is a block diagram illustrating a further example digital value generator.

The upper and lower signals generated by the voltage reference and feedback block 102 in FIG. 1 are passed to the digital control signal generator 104, and similarly the present disclosure is not in any way limited to any particular type of control signal generator. Examples of a digital control signal generator and digital value generators are shown in FIGS. 5, 6, and 7.

Figure 5:
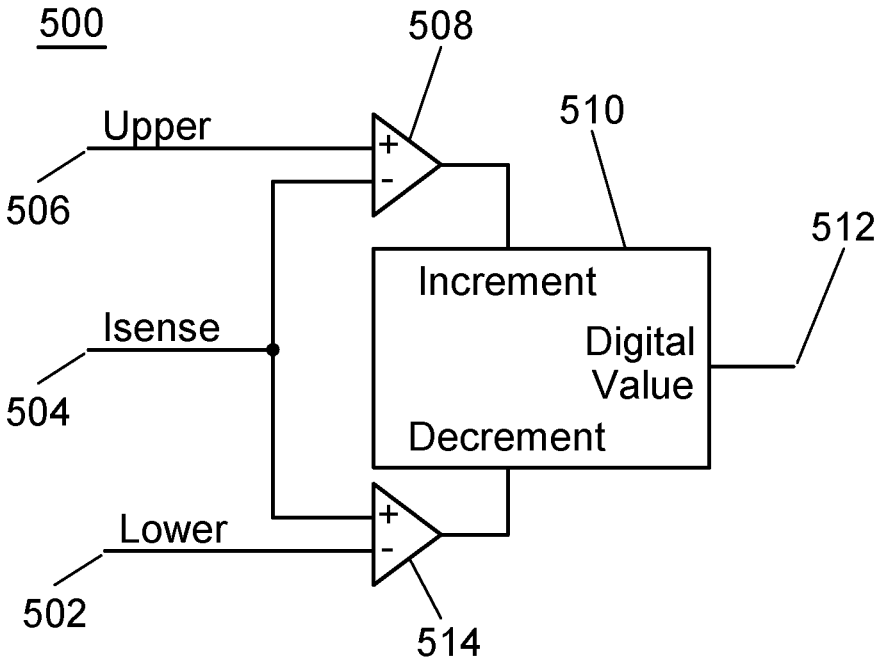
FIG. 5 is a block diagram illustrating an example digital control signal generator.

FIG. 5 is a block diagram illustrating an example digital control signal generator 500, which may be implemented as part of digital control signal generator 104 in FIG. 1, for example. The example digital control signal generator 500 includes a terminal 502, a terminal 504, a terminal 506, a first comparator 508, a digital value generator 510, a terminal 512, and a second comparator 514, interconnected as shown.

The comparators 508, 514 operate on analog inputs, and common comparator implementation includes an operational amplifier. Other types of comparators may also or instead be used. The digital value generator 510 may take any of various forms, and illustrative example implementations are provided below with reference to FIGS. 6 and 7.

In an embodiment that is consistent with FIGS. 1 and 5, the terminal 502 receives the lower signal from voltage reference and feedback block 102, the terminal 506 receives the upper signal from voltage reference and feedback block 102, and the terminal 504 receives the Isense signal from current sense element 120.

The first comparator 508 is connected to receive the upper signal from the terminal 506 at its positive input and the Isense signal from the terminal 504 at its negative input.

The second comparator 514 is connected to receive the lower signal from the terminal 502 at its negative input and the Isense signal from the terminal 504 at its positive input.

The first comparator 508 generates an increment signal when the upper signal is greater than the Isense signal. The increment signal is provided to the increment input of the digital value generator 510 in the example shown.

The second comparator 514 generates a decrement signal when the lower signal is less than the Isense signal. The decrement signal is provided to the decrement input of the digital value generator 510 in the example shown.

The digital value generator 510 receives an increment input from first comparator 508 and a decrement input from second comparator 514 and produces a digital value signal at the terminal 512. Examples of how such features may be provided or supported in some embodiments are provided at least below, with reference to FIG. 6 and FIG. 7.

In an implementation of the example digital control signal generator 500 as the digital control signal generator 104 in FIG. 1, for example, the digital value signal at the terminal 512 is provided to a control input of the digitally controlled voltage source 114.

FIG. 5 is illustrative of an embodiment in which a digital control signal at the terminal 512, to control a digitally controlled voltage source, may be or include a digital value. In general, a digital control signal generator may be configured to generate such a digital value by incrementing the digital value responsive to the upper signal being above a current sense signal (such as the Isense signal in FIG. 1) from a current sense element such as the current sense element 120 in FIG. 1, and decrementing the digital value responsive to the lower signal being below the current sense signal. The Isense signal is an example of a current sense signal that indicates, is indicative of, is based on, or is related to the output current of the digitally controlled voltage source.

Within this context of incrementing and decrementing the digital value responsive to how the Isense signal compares to the upper and lower signals, the first comparator 508 may be described as being coupled to a current sense element to receive the current sense signal and to determine whether the upper signal is above the current sense signal, and the second comparator 514 may be described as being coupled to the current sense element to receive the current sense signal and to determine whether the lower signal is below the current sense signal.

Examples of a digital value generator that may be implemented as the digital value generator 510 in some embodiments are provided in FIGS. 6 and 7.

FIG. 6 is a block diagram illustrating an example digital value generator 600 that includes a terminal 602, a terminal 604, a first AND logic gate 606, an up-down counter 608, a terminal 610, a second AND logic gate 612, and a clock source 614, interconnected as shown. Various implementations of AND logic gates, up-down counters, and clock sources will be readily apparent to those familiar with power electronics and control.

The terminal 604 receives an increment input signal, from the first comparator 508 in FIG. 5 for example, and provides it to a first input of the first AND logic gate 606.

The terminal 602 receives a decrement input signal, from the second comparator 514 in FIG. 5 for example, and provides it to a first input of the second AND logic gate 612.

The clock source 614 generates a clock signal that is provided to a second input of the first AND logic gate 606 and to a second input of the second AND logic gate 612.

When the increment signal at terminal 604 is asserted, the output of the first AND logic gate 606 provides pulses at the clock rate of the clock source 614 to the Up input of the up-down counter 608, incrementing the digital value signal at terminal 610.

Similarly, when a decrement signal at terminal 602 is asserted, the output of the second AND logic gate 612 provides pulses at the clock rate of the clock source 614 to the Down input of the up-down counter 608, decrementing the digital value signal at terminal 610.

Thus, the digital value signal at terminal 610 will be periodically incremented at the clock rate of the clock source 614 when the increment signal at terminal 604 is asserted, and periodically decremented at the clock rate of the clock source 614 when the decrement signal at terminal 602 is asserted.

In FIG. 6, multi-step or multi-value incrementing and decrementing are provided by the first AND logic gate 606 and the second AND logic gate 612, both of which are coupled to the clock source 614 and to up-down counter 608, to receive a clock signal at the clock rate from the clock source. The first AND logic gate 606 also receives a signal, from the first comparator 508 in FIG. 5 for example, indicating whether the upper signal is above the Isense signal, and similarly the second AND logic gate 612 receives a signal from the second comparator 514 in FIG. 5 for example, indicating whether the lower signal is below the Isense signal. The first AND logic gate 606 provides a first signal to the Up input of the up-down counter 608 at the clock rate to increment the count value and thus the digital value signal at terminal 610 responsive to the upper signal being above the Isense signal, and the second AND logic gate 612 provides a second signal to the Down input of the up-down counter 608 at the clock rate to decrement the count value and thus the digital value signal at terminal 610 responsive to the lower signal being below the Isense signal.

FIG. 6 illustrates an embodiment in which a digital value generator, and thus a digital control signal generator such as 500 in FIG. 5 that includes such a digital value generator, includes a clock source 614 and an up-down counter 608, coupled to the clock source, to generate a count value as a digital value to control a voltage source. The count value at the terminal 610 is incremented at a rate corresponding to a clock rate of the clock source 614 responsive to assertion of the increment input signal at terminal 604 (and thus responsive to the upper signal being above the current sense signal, which is when the increment input signal is asserted), or decremented at the rate corresponding to the clock rate of the clock source responsive to assertion of the decrement input signal at terminal 602 (and thus responsive to the lower signal being below the current sense signal, which is when the decrement input signal is asserted).

This type of arrangement and control may be of particular benefit when Isense in FIG. 5, for example, is above the upper signal or below the lower signal and thus is outside its target range, meaning that the output current is also outside its target range. In this situation, the digital value may be incremented or decremented multiple times, to return the output current and thus the Isense signal to within their target ranges more quickly than if the digital value were to be incremented or decremented only by one in response to a comparator output being asserted at the Up or Down input of a counter.

FIG. 7 is a block diagram illustrating another example digital value generator 700, which may be implemented as the digital value generator 510 in FIG. 5, for example. The example digital value generator includes a terminal 702, a terminal 704, an up-down counter 708, and a terminal 710, interconnected as shown.

The terminal 704 receives an increment input signal, from the first comparator 508 in FIG. 5 for example, and provides it to up-down counter 708 to increment the digital value signal at the terminal 710.

The terminal 702 receives a decrement input signal, from second comparator 514 in FIG. 5 for example, and provides it to up-down counter 708 to decrement the digital value signal at the terminal 710.

FIG. 7 illustrates an embodiment in which a digital value generator, and thus a digital control signal generator such as 500 in FIG. 5 that includes such a digital value generator, includes an up-down counter 708 to generate a count value and thus a digital signal value at the terminal 710 to control a voltage source.

The count value at terminal 710 is incremented by the up-down counter 708 responsive to the increment signal asserted at the Up input of the up-down counter 708 (and thus responsive to the upper signal being above the current sense signal, which is when the increment signal is asserted) and is decremented by the up-down counter responsive to the decrement signal asserted at the Down input of the up-down counter 708 (and thus responsive to the lower signal being below the current sense signal, which is when the decrement signal is asserted). Thus, the increment signal increases the digital value signal produced at the terminal 710. Likewise, the decrement signal decreases the digital value signal produced at the terminal 710. Thus, the digital value signal at the terminal 710 is responsive to the increment value at the terminal 704 and the decrement value at the terminal 702.

Thus, in embodiments consistent with implementing either of the examples in FIGS. 6 and 7 as the digital value generator 510 in FIG. 5, the digital value at the terminal 512 of FIG. 5 is responsive to an upper signal at the terminal 506 being greater than the Isense signal at the terminal 504 such that the digital value increases. Likewise, the digital value at the terminal 512 of FIG. 5 is responsive to a lower signal at the terminal 502 being less than the Isense signal at the terminal 504 such that the digital value decreases.

In such embodiments, the digital value generated by the digital control signal generator 104 is therefore responsive to an upper signal and lower signal from the voltage reference and feedback block 102, and responsive to the Isense signal from the current sense element 120. When the upper signal is greater than the Isense signal, the digital value increases, and when the lower signal is less than the Isense signal, the digital value decreases.

The digital value generated by digital control signal generator 104 is provided as a control signal to the digitally controlled voltage source 114. The digitally controlled voltage source 114 produces an output voltage Vout at the terminal 116 responsive to the digital value.

As noted above, embodiments disclosed herein are not restricted to any particular type of digitally controlled voltage source 114, and an illustrative example of such a voltage source is provided below with reference to FIG. 8.

Figure 8:
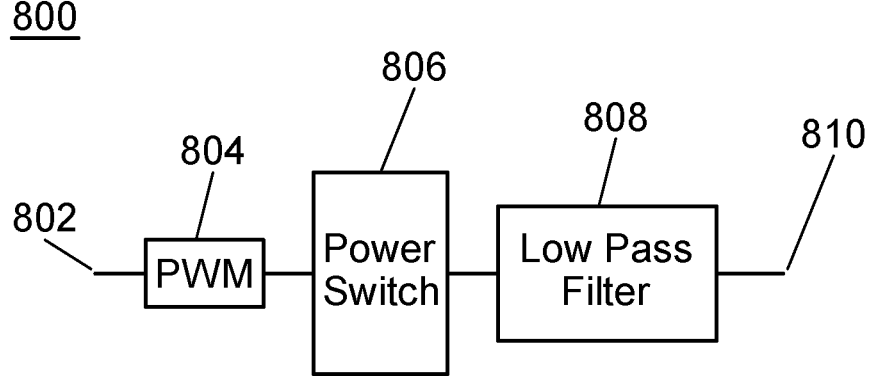
FIG. 8 is a block diagram illustrating an example digitally controlled voltage source.

Digitally controlled voltage source 114 in FIG. 1 may be implemented, for example, by the digitally controlled voltage source 800 in FIG. 8. The example digitally controlled voltage source 800 includes a terminal 802, a PWM block 804, a power switch block 806, a low pass filter 808, and a terminal 810, interconnected as shown.

Various options for implementing the PWM block 804, the power switch block 806 which may be a power converter including multiple individual power switches for example, and the low pass filter 808 will be readily apparent to those familiar with power electronics and control. The example digitally controlled voltage source 800 is intended solely for the purpose of illustration, and the embodiments disclosed herein are not limited to PWM-based power supplies.

A digital value is received at terminal 802, from the digital control signal generator 104 in FIG. 1 for example, and provided to the PWM block 804.

The PWM block 804 generates a PWM signal based on the digital value at its input. The PWM signal is provided to the power switch block 806, which switches power based on the PWM signal to generate PWM power pulses. The PWM power pulses are provided to the low pass filter 808, which filters the signal to produce a smooth output voltage at the terminal 810, which is the Vout signal at terminal 116 of FIG. 1 in embodiments consistent with FIGS. 1 and 8.

A digital value is one example of a digital control signal to control a voltage source, and in the example shown in FIG. 8, this digital control signal controls generation of a PWM output to control switching in the voltage source. The present disclosure is not in any way limited to PWM-based power sources, any particular type of power switches or power switch blocks, or power sources that include filtering. FIG. 8 is an illustrative and non-limiting example.

Embodiments are described above primarily in the context of power circuits or components thereof. Method embodiments are also possible.

Figure 9:
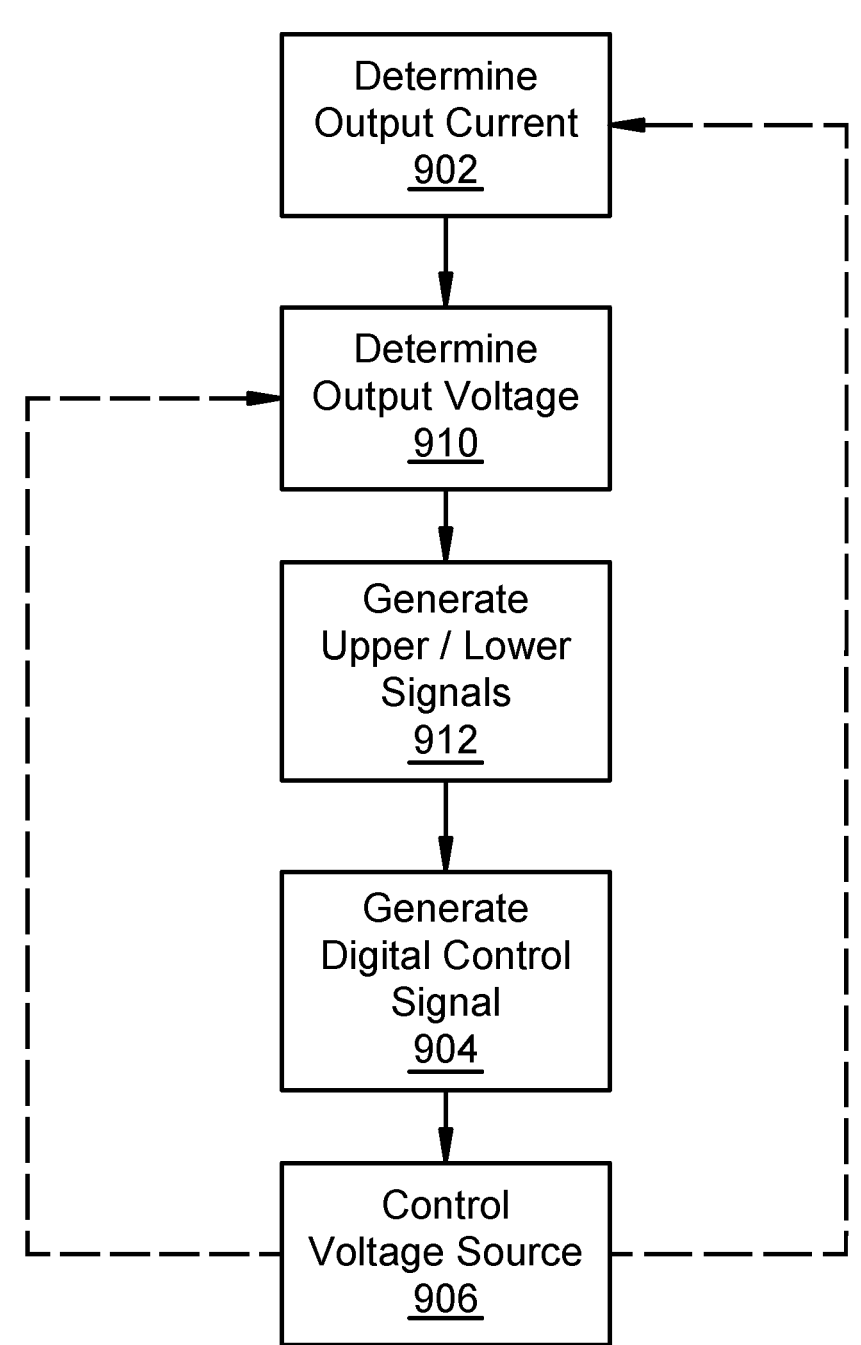
FIG. 9 is a flow diagram illustrating an example method according to an embodiment.

FIG. 9 is a flow diagram illustrating an example method according to an embodiment.

The example method 900 involves, at 902, determining an output current of a voltage source. The output current may be determined by sensing the output current using a current sensor such as the current sense element 120 in FIG. 1, for example, or receiving a signal such as Isense in FIG. 1, for example.

Of particular relevance to control, FIG. 9 illustrates generating a digital control signal at 906. The digital control signal is to control the voltage source, based on the output current and upper and lower signals. As described in detail elsewhere herein, the upper and lower signals are based on respective positive and negative offsets and a difference between a reference signal and a feedback signal related to the output voltage. For completeness, FIG. 9 also illustrates determining the output voltage at 910, which may involve a feedback signal as described in detail at least above, and generating the upper and lower signals at 912. These operations are shown separately in FIG. 9, because they may be implemented or supported separately from voltage source control, as in the example shown in FIG. 1. In FIG. 1, feedback and reference signal generation are implemented by the voltage reference and feedback block 102, whereas control is implemented by the digital control signal generator 104.

Controlling a voltage source as shown at 906 is also shown separately in FIG. 9, to illustrate that a digitally controlled voltage source may similarly be implemented separately from control, as in the example power circuit 100 in FIG. 1.

In some embodiments, as shown by way of example in FIGS. 2 and 3, the upper and lower signals are based on the positive and negative offsets and a digital error signal that is based on the difference between the reference signal and the feedback signal. Embodiments in which the upper and lower signals are based on the positive and negative offsets and an analog error signal that is based on the difference between the reference signal and the feedback signal, as shown by way of example in FIG. 4, are also possible. Thus, an error signal may be digital or analog, and as described elsewhere herein may be a compensated error signal or an uncompensated error signal.

Consistent with FIG. 2, for example, the upper signal may be a first analog signal converted (at 208) from a digital error signal that is based on the difference between the reference signal and the feedback signal and is shifted upward (at 216) by the positive offset, and the lower signal may be a second analog signal converted (at 214) from the digital error signal that is based on the difference between the reference signal and the feedback signal and is shifted downward (at 216) by the negative offset. In the context of method operations, a method may involve shifting the digital error signal upward by the positive offset (at 216), generating the upper signal by converting the upward shifted digital error signal to analog (at 208), shifting the digital error signal downward by the negative offset (at 216), and generating the lower signal by converting the downward shifted digital error signal to analog (at 214).

With reference to FIG. 3 as an example, the upper signal may be an upward shifted analog signal, converted (at 308) from a digital error signal that is based on the difference between the reference signal and the feedback signal, and shifted upward (at 309) by the positive offset; and the lower signal may be a downward shifted analog signal, converted (at 308) from the digital error signal, and shifted downward (at 316) by the negative offset. Method operations to provide such features may include converting the digital error signal to an analog signal (at 308), generating the upper signal by shifting the analog signal upward by the positive offset (at 309), and generating the lower signal by shifting the analog signal downward by the negative offset (at 316).

As another example, the upper signal may be an upward shifted analog signal that is based on the difference between the reference signal and the feedback signal and shifted upward by the positive offset, and the lower signal may be a downward shifted analog signal that is based on the difference between the reference signal and the feedback signal and shifted downward by the negative offset. This is consistent with FIG. 4, for example. Method operations to provide these features may include, for example, generating the upper signal by shifting upward, by the positive offset, (at 409 for example) an analog signal that is based on the difference between the reference signal and the feedback signal, and generating the lower signal by shifting the analog signal downward by the negative offset (at 416 for example).

These options related to the upper and lower signals provide examples of features and operations that may be involved in generating the upper and lower signals at 912 in some embodiments.

Regarding a reference signal based upon which the upper and lower signals may be generated, the reference signal may be a digital reference signal or an analog reference signal.

The feedback signal for upper and lower signal generation may be a digital feedback signal or an analog feedback signal. A digital feedback signal may be fed back as a digital signal, or converted from analog into a digital feedback signal as shown by way of example at 218, 318 in FIGS. 2 and 3, respectively.

The digital control signal generated at 904 may be or include a digital value in some embodiments. Generating the digital control signal may then involve incrementing the digital value responsive to the upper signal being above a current sense signal that is indicative of the output current, and/or decrementing the digital value responsive to the lower signal being below the current sense signal. For example, a method may include comparing the current sense signal and the upper signal to determine whether the upper signal is above the current sense signal, comparing the current sense signal and the lower signal to determine whether the lower signal is below the current sense signal, and incrementing or decrementing the digital value based on the comparison results. This is consistent with a comparator-based embodiment such as the example shown in FIG. 5.

In some embodiments, incrementing and decrementing a digital value involve incrementing and decrementing a count value of a counter, such as an up-down counter as shown by way of example in FIGS. 6 and 7.

The incrementing and decrementing may involve incrementing or decrementing the count value at a rate corresponding to a clock rate of a clock source, consistent with the example shown in FIG. 6.

Control of a voltage source at 906 is not specific to any particular type of voltage source. In some embodiments, the digital control signal that is generated at 904 controls generation of a PWM output to control switching in the voltage source. A PWM-based voltage source is shown by way of example in FIG. 8, but again this is an illustrative example and embodiments are not in any way restricted to PWM-based voltage sources.

Power control may be an ongoing progress, and the dashed return paths from 906 to 902, 910 in FIG. 9 are intended to represent that parameters such as the output current and voltage may be monitored to control the voltage source to regulate output voltage to a target voltage.

FIG. 9 illustrates an example method. The illustrated operations may be provided or supported in any of various ways, and other embodiments may include fewer, additional, and/or different operations or features, performed in a similar or different order. At least some variations to the example method shown in FIG. 9 may be or become apparent, for example, from features that are disclosed above, with reference to any of FIGS. 1-8 and apparatus embodiments.

Various embodiments of average current mode control are disclosed herein. These embodiments encompass implementations of hysteretic average current mode control. The upper signal and the lower signal are offset from an error signal, which may or may not be a compensated error signal, such that the error signal is a midpoint of the upper and lower signals. A digitally controlled voltage source is controlled to maintain the Isense signal at a value which varies between the upper signal and the lower signal. This regulates the Isense signal's average value to a value which corresponds to the error signal, but varies between hysteretic limits set by the upper signal and the lower signal.

The disclosed embodiments also encompass multi-loop control that involves a voltage servo control loop and a current servo control loop. With reference again to FIG. 1, a first signal path starting from the terminal 116, through the voltage reference and feedback block 102, through the digital control signal generator 104, through the digitally controlled voltage source 114, and back to the terminal 116, forms a voltage servo control loop to regulate the output voltage Vout to a value set by voltage reference and feedback block 102.

A second signal path starting from the current sense element 120, through the digital control signal generator 104, through the digitally controlled voltage source 114, and through the terminal 116, to create a current through the load(s) 118 that is then sensed by the current sense element 120, forms a current servo control loop. This current servo control loop hysteretically regulates the current through the load(s) 118 to an average value that is set by the upper and lower inputs to the digital control signal generator 104.

The current servo control loop is nested within the voltage servo control loop to regulate the output current to an average value corresponding to the mid-point of the upper signal and the lower signal. This current servo control loop forces the digitally controlled voltage source 114 to behave as a current source that is controlled by the error signal within the voltage and reference feedback block 102 in the voltage servo control loop. Notably, in embodiments that involve error signal compensation, compensation may be implemented in the voltage and reference feedback block 102 (in the voltage servo control loop), and the current servo loop need not include its own error compensation block for error signal compensation.

What has been described is merely illustrative of the application of principles of embodiments of the present disclosure. Other arrangements and methods can be implemented by those skilled in the art.

For example, embodiments need not include all elements or components that are shown in the drawings or described herein. Embodiments may include additional, fewer, and/or different components or elements.

It should also be appreciated that features disclosed herein in the context of a particular embodiment, such as an apparatus embodiment, are not limited only to that embodiment. Features may also or instead be implemented in other embodiments, such as a method embodiment. Similarly, method features may also or instead be implemented, supported, or otherwise provided in apparatus embodiments.

In addition, although described primarily in the context of methods and apparatus such as power circuits, other implementations are also contemplated, as instructions stored on a non-transitory computer-readable medium, for example.

The invention claimed is:

1. An apparatus comprising:
a current sense element to determine an output current of a voltage source;
a digital control signal generator coupled to the current sense element, to generate a digital control signal to control the voltage source, based on the output current and upper and lower signals, the upper and lower signals based on respective positive and negative offsets and a difference between a reference signal and a feedback signal related to the output voltage,
wherein the upper signal comprises a first analog signal converted from a digital error signal that is based on the difference between the reference signal and the feedback signal and is shifted upward by the positive offset;

wherein the lower signal comprises a second analog signal converted from the digital error signal that is based on the difference between the reference signal and the feedback signal and is shifted downward by the negative offset.

2. The apparatus of claim 1, wherein the reference signal comprises a digital reference signal and the feedback signal comprises a digital feedback signal or an analog feedback signal converted to a digital feedback signal.

3. The apparatus of claim 1, wherein the reference signal comprises an analog reference signal and the feedback signal comprises an analog feedback signal.

4. The apparatus of claim 1, wherein the digital control signal controls generation of a pulse width modulation (PWM) output to control switching in the voltage source.

5. An apparatus comprising:
a current sense element to determine an output current of a voltage source;
a digital control signal generator coupled to the current sense element, to generate a digital control signal to control the voltage source, based on the output current and upper and lower signals, the upper and lower signals based on respective positive and negative offsets and a difference between a reference signal and a feedback signal related to the output voltage;
an offset signal generator to receive a digital error signal that is based on the difference between the reference signal and the feedback signal, and to shift the digital error signal upward by the positive offset and downward by the negative offset;
a first digital to analog converter, coupled to the offset signal generator, to generate the upper signal by converting the upward shifted digital error signal to analog;
a second digital to analog converter, coupled to the offset signal generator, to generate the lower signal by converting the downward shifted digital error signal to analog.

6. The apparatus of claim 5, wherein the reference signal comprises a digital reference signal and the feedback signal comprises a digital feedback signal or an analog feedback signal converted to a digital feedback signal.

7. The apparatus of claim 5, wherein the reference signal comprises an analog reference signal and the feedback signal comprises an analog feedback signal.

8. The apparatus of claim 5, wherein the digital control signal controls generation of a pulse width modulation (PWM) output to control switching in the voltage source.

9. An apparatus comprising:
a current sense element to determine an output current of a voltage source;
a digital control signal generator coupled to the current sense element, to generate a digital control signal to control the voltage source, based on the output current and upper and lower signals, the upper and lower signals based on respective positive and negative offsets and a difference between a reference signal and a feedback signal related to the output voltage,
wherein the digital control signal comprises a digital value,
wherein the digital control signal generator is configured to generate the digital value by incrementing the digital value responsive to the upper signal being above a current sense signal from the current sense element that is indicative of the output current, and decrementing the digital value responsive to the lower signal being below the current sense signal.

10. The apparatus of claim 9, wherein the digital control signal generator comprises:

a first comparator, coupled to the current sense element, to receive the current sense signal and to determine whether the upper signal is above the current sense signal;

a second comparator, coupled to the current sense element, to receive the current sense signal and to determine whether the lower signal is below the current sense signal.

11. The apparatus of claim 9, wherein the digital control signal generator comprises:

a counter to generate a count value as the digital value, the count value being incremented responsive to the upper signal being above the current sense signal and decremented responsive to the lower signal being below the current sense signal.

12. The apparatus of claim 9, wherein the digital control signal generator comprises:

a clock source;

a counter, coupled to the clock source, to generate a count value as the digital value, the count value being incremented at a rate corresponding to a clock rate of the clock source responsive to the upper signal being above the current sense signal, or decremented at the rate corresponding to the clock rate of the clock source responsive to the lower signal being below the current sense signal.

13. The apparatus of claim 12, wherein the digital control signal generator further comprises:

a first AND logic gate coupled to the clock source and to the counter, to receive a clock signal at the clock rate from the clock source and a signal indicating whether the upper signal is above the current sense signal, and to provide a first signal to the counter at the clock rate to increment the count value responsive to the upper signal being above the current sense signal;

a second AND logic gate coupled to the clock source and to the counter, to receive the clock signal from the clock source and a signal indicating whether the lower signal is below the current sense signal, and to provide a second signal to the counter at the clock rate to decrement the count value responsive to the lower signal being below the current sense signal.

14. The apparatus of claim 9, wherein the reference signal comprises a digital reference signal and the feedback signal comprises a digital feedback signal or an analog feedback signal converted to a digital feedback signal.

15. The apparatus of claim 9, wherein the reference signal comprises an analog reference signal and the feedback signal comprises an analog feedback signal.

16. The apparatus of claim 9, wherein the digital control signal controls generation of a pulse width modulation (PWM) output to control switching in the voltage source.

17. A method comprising:

determining an output current of a voltage source;

generating a digital control signal, to control the voltage source, based on the output current and upper and lower signals, the upper and lower signals based on respective positive and negative offsets and a difference between a reference signal and a feedback signal related to the output voltage;

shifting upward by the positive offset, a digital error signal that is based on the difference between the reference signal and the feedback signal;

generating the upper signal by converting the upward shifted digital error signal to analog;

shifting downward by the negative offset, the digital error signal;

generating the lower signal by converting the downward shifted digital error signal to analog.

18. The method of claim 17, wherein the reference signal comprises a digital reference signal and the feedback signal comprises a digital feedback signal or an analog feedback signal converted to a digital feedback signal.

19. The method of claim 17, wherein the reference signal comprises an analog reference signal and the feedback signal comprises an analog feedback signal.

20. The method of claim 17, wherein the digital control signal controls generation of a pulse width modulation (PWM) output to control switching in the voltage source.

21. A method comprising:

determining an output current of a voltage source;

generating a digital control signal, to control the voltage source, based on the output current and upper and lower signals, the upper and lower signals based on respective positive and negative offsets and a difference between a reference signal and a feedback signal related to the output voltage, wherein the digital control signal comprises a digital value, wherein generating the digital control signal comprises:

incrementing the digital value responsive to the upper signal being above a current sense signal that is indicative of the output current;

decrementing the digital value responsive to the lower signal being below the current sense signal.

22. The method of claim 21, further comprising:

comparing the current sense signal and the upper signal to determine whether the upper signal is above the current sense signal;

comparing the current sense signal and the lower signal to determine whether the lower signal is below the current sense signal.

23. The method of claim 21, further comprising:

generating a count value as the digital value;

incrementing the count value responsive to the upper signal being above the current sense signal and decrementing the count value responsive to the lower signal being below the current sense signal.

24. The method of claim 21, wherein the reference signal comprises a digital reference signal and the feedback signal comprises a digital feedback signal or an analog feedback signal converted to a digital feedback signal.

25. The method of claim 21, wherein the reference signal comprises an analog reference signal and the feedback signal comprises an analog feedback signal.

26. The method of claim 21, wherein the digital control signal controls generation of a pulse width modulation (PWM) output to control switching in the voltage source.

* * * * *